United States Patent
Lim et al.

(10) Patent No.: US 7,096,400 B2
(45) Date of Patent: Aug. 22, 2006

(54) ADAPTIVE HYBRID AUTOMATIC REPEAT REQUEST METHOD AND APPARATUS

(75) Inventors: Dong-sun Lim, Seoul (KR); Chung-gu Kang, Seoul (KR); Sang-boh Yun, Seongnan (KR)

(73) Assignee: Samsung Electronics Co., Ltd., (KR)

( * ) Notice: Subject to any disclaimer, the term of this patent is extended or adjusted under 35 U.S.C. 154(b) by 387 days.

(21) Appl. No.: 10/667,160

(22) Filed: Sep. 17, 2003

(65) Prior Publication Data

US 2004/0153909 A1 Aug. 5, 2004

(30) Foreign Application Priority Data

Sep. 17, 2002 (KR) ...................... 10-2002-0056314

(51) Int. Cl.
*G01R 31/28* (2006.01)
(52) U.S. Cl. ..................................... 714/748
(58) Field of Classification Search ................ 714/748, 714/749, 758, 774
See application file for complete search history.

(56) References Cited

U.S. PATENT DOCUMENTS

2003/0145269 A1* 7/2003 Kuo et al. .................. 714/749

FOREIGN PATENT DOCUMENTS

| CN | 1336049 | 2/2002 |
|---|---|---|
| EP | 1 168 703 | 1/2002 |
| JP | 2002-009741 | 1/2002 |
| JP | 2002/051003 | 2/2002 |
| JP | 2002-527939 | 8/2002 |
| WO | WO 01/01624 | 1/2001 |
| WO | WO 01/91358 | 11/2001 |

OTHER PUBLICATIONS

Lin et al., "A Hybrid ARQ Scheme with Parity Retransmission for Error Control of Satellite Channels", IEEE Transactions on Communications, vol. COM-30, No. 7, Jul. 1982, pp. 1701-1719.

Ahn et al., "Hybrid ARQ Protocol for Real-Time ATM Services in Broadband Radio Access Networks", 1999 IEEE Tencon, pp. 1379-1382.

Coulton et al., "Simple Hybrid Type II ARQ Technique Using Soft Output Information", Electronic Letters, 28th Sep. 2000, vol. 36, No. 20, pp. 1716-1717.

Chung et al., "On the Design of Low-Density Parity-Check Codes within 0.0045 dB of the Shannon Limit", IEEE Communications Letters, vol. 5, No. 2, Feb. 2001, pp. 58-60.

(Continued)

Primary Examiner—Albert Decady
Assistant Examiner—James C. Kerveros
(74) Attorney, Agent, or Firm—Dilworth & Barrese LLP

(57) ABSTRACT

"An adaptive hybrid automatic repeat request system and method include transmitting a data frame having channel-coded data and a parity bit using an initial coding rate, receiving the data frame and performing channel decoding and correcting any error that exists. When the error is not corrected, an error degree of a corresponding frame is measured and a NACK message to which the measured error degree is added is transmitted to the transmitting terminal. A parity frame is retransmitted by channel coding a parity bit corresponding to a parity level determined in accordance with the error degree added to the NACK message, and is combined with a data bit of a data frame in which error correction fails. Channel decoding and error correction are then performed."

20 Claims, 8 Drawing Sheets

OTHER PUBLICATIONS

MacKay et al., "Near Shannon Limit Performance of Low Density Parity Check Codes", Electronic Letters, 13th Mar. 1997, vol. 33, No. 6, pp. 457-458.

Eriksson et al., "Comparison of Link Quality Control Strategies for Packet Data Services in EDGE", Vehicular Technology Conference, May 1999.

* cited by examiner

ADAPTIVE HYBRID AUTOMATIC REPEAT REQUEST METHOD AND APPARATUS

PRIORITY

This application claims the priority of Korean Patent Application No. 2002-56314, filed on Sep. 17, 2002, in the Korean Intellectual Property Office, the disclosure of which is incorporated herein in its entirety by reference.

BACKGROUND OF THE INVENTION

1. Field of the Invention

The present invention relates generally to a hybrid automatic repeat request (ARQ) system, and more particularly, to an adaptive hybrid ARQ method and apparatus that minimizes transmission delay by measuring an error degree of a frame in which error correction fails at a receiving terminal and retransmitting a parity bit in accordance with the error degree at a transmitting terminal, and a method of transmitting and receiving data in an adaptive hybrid ARQ system.

2. Description of the Related Art

A hybrid ARQ system combines a basic ARQ technique, which requests retransmission from a transmitting terminal by detecting an error from a received signal, with a forward error correction (FEC) channel coding technique, which overcomes deterioration of the channel. The hybrid ARQ system is designed to increase the overall throughput of a wireless communications system in time-varying channels. The hybrid ARQ system uses three hybrid ARQ methods: type I, type II, and type-III. The hybrid type II ARQ method has been proposed to solve problems of the hybrid type I ARQ method. In this method, ARQ is adaptively used for a channel having a dynamic bit-error-rate depending on the state of the channel. Two codes are used in the hybrid type-II ARQ method. One code is used to generate an n-bit code word D by using an error detection code $C_0$ of (n, k) in a message bit k. The other code is used to generate a 2 k-bit parity block P(D) by using an error detection and correction code $C_1$ of (2 k, k) in a parity bit k. A new code word F=(D,P(D)) is generated using the code word D and the parity block P(D) that are respectively generated using the two codes $C_0$ and $C_1$. When a block D of a new code word F is transmitted and an error is detected at a receiver side using the error detection code $C_0$, the received block D is stored in a buffer, and retransmission is requested from a transmitter side. Upon this request, if the transmitter side retransmits only the parity block P(D), when a syndrome is calculated and an error is not detected at the receiver side, the code word D can be recovered using the parity block P(D). However, if the error is detected at the receiver side, the error is corrected by means of the error detection and correction code $C_1$ using the block D stored in the buffer and the parity block P(D). If error correction fails in the two steps, the block D stored in the buffer is discarded and the parity block P(D) instead is stored in the buffer, and then, retransmission is requested from the transmitter side. The transmitter side that has been requested of retransmission retransmits the block D, instead of the parity block P(D), so as to repeat the error detection and correction procedure. Even when the block D is received free of errors or an error is detected, the above procedure is repeated until a code word that can correct the error successfully is received.

An example of the hybrid type-II ARQ method is illustrated in FIG. 1. Referring to FIG. 1, a transmitter 110 transmits a data frame comprising a parity bit 121 and a data bit 122 that are generated using a code having a high coding rate during initial transmission. A receiver 130 receives the data frame and performs channel decoding of the received data frame. If channel decoding fails, the receiver 130 transmits a negative acknowledgement (NACK) message 123 to the transmitter 110. When receiving the NACK message 123, the transmitter 110 transmits a parity frame comprising a parity bit 124 that is generated using a code having a lower coding rate than an initial coding rate.

Next, the receiver 130 corrects an error that occurs in a previous message using the transmitted parity bit 124. If this error correction is successful, the receiver 130 transmits an ACK message 127 to the transmitter 110. If the error correction is not successful, the receiver 130 transmits a NACK message 125 to the transmitter 110. When receiving the NACK message 125, the transmitter 110 transmits a parity frame comprised of a parity bit 126 that is generated using a code having a lower coding rate than a previous coding rate. The receiver 130 corrects an error that occurs in a previous message using the transmitted parity bit 126. If this error correction is successful, the receiver 130 transmits the ACK message 127 to the transmitter 110.

In the above-described method, a message bit of a previously transmitted frame is reused so that improvement of the overall throughput is achieved. However, if frame transmission fails, a parity bit is transmitted by reducing a coding rate stepwise. As such, transmission delay TD1 becomes longer. Ultimately, due to the longer transmission delay, limitation of a transmission time on real-time data, such as voice, cannot be satisfied. In addition, data must be stored in a transmission buffer and a receiving buffer during several retransmissions, resulting in buffer overflow.

Basic technologies for hybrid ARQ are described in the articles "A Hybrid ARQ Scheme With Parity Retransmission for Error Control of Satellite Channels," by S. Lin and P. S. Yu, IEEE Transaction on Communications, Vol. 30, pp. 1701–1719, July 1982, "Hybrid ARQ Protocol for Real-time ATM Services in Broadband Radio Access Networks," by C. W. Ahn, W. S. Kang, CH. Kang and C. G. Kang, IEEE TENCON 99, Vol. 2, pp. 1379–1382, 1999 and "Simple Hybrid Type II ARQ Technique Using Soft Output Information," by P. Coulton, C. Tanriover, B. Wright and B. Honary IEE Electronic letters, Vol. 36, No.20, pp. 1716–1717, September 2000.

SUMMARY OF THE INVENTION

The present invention provides an adaptive hybrid automatic repeat request (ARQ) method and apparatus that minimize transmission delay by measuring an error degree of a frame in which error correction fails at a receiving terminal, adding the error degree to a NACK message, transmitting the NACK message to a transmitting terminal, and retransmitting a parity bit in accordance with the error degree at the transmitting terminal.

The present invention also provides a method of transmitting data in an adaptive hybrid ARQ system by which a parity bit in accordance with an error degree added to a NACK message transmitted from a receiving terminal is generated and retransmitted.

The present invention also provides a method of receiving data in an adaptive hybrid ARQ system by which as a result of channel decoding of a data frame transmitted from a transmitting terminal, an error degree of a frame in which error correction fails is measured and transmitted to the transmitting terminal together with a NACK message.

According to an aspect of the present invention, an adaptive hybrid automatic repeat request method comprises: (a) transmitting a data frame including a data bit and a parity bit that are channel-coded using a predetermined initial coding rate; (b) receiving the data frame, performing channel decoding of the received data frame, and when an error exists in the channel-decoded data frame, correcting the error; (c) when there is no error in the channel-decoded data frame or the error is corrected, transmitting an acknowledgement message to a transmitting terminal; (d) when the error of the channel-decoded data frame is not corrected, measuring an error degree of a corresponding frame and transmitting a negative acknowledgement message to which the measured error degree is added, to the transmitting terminal; (e) transmitting a parity frame that is generated by performing channel coding of a parity bit corresponding to a parity level determined in accordance with the error degree added to the negative acknowledgement message; and (f) combining the retransmitted parity bit with a data bit of a data frame in which error correction fails and performing channel decoding and error correction.

According to another aspect of the present invention, an adaptive hybrid automatic repeat request apparatus comprises: a transmitter for transmitting a data frame comprising a data bit and a parity bit that are channel-coded using a predetermined initial coding rate, and retransmitting a parity frame that is generated by performing channel coding of a parity bit corresponding to a parity level determined in accordance with the error degree added to the negative acknowledgement message transmitted via a predetermined channel; and a receiving unit for receiving a data frame transmitted from the transmitter, performing channel decoding of the received data frame, when there is no error in the channel-decoded data frame or the error is corrected, transmitting an acknowledgement message to the transmitter, when the error of the channel-decoded data frame is not corrected, measuring an error degree of a corresponding frame and transmitting a negative acknowledgement message to which the measured error degree is added, to the transmitter, combining a parity bit that corresponds to the negative acknowledgement message and is retransmitted from the transmitter, with a data bit of a data frame in which error correction fails, and performing channel decoding and error correction.

According to yet another aspect of the present invention, a method of transmitting data in an adaptive hybrid automatic repeat request system comprises: (a) transmitting a data frame comprising a data bit and a parity bit that are channel-coded using a predetermined initial coding rate; and (b) retransmitting a parity frame that is generated by performing channel coding of a parity bit corresponding to a parity level determined in accordance with the error degree added to the negative acknowledgement message transmitted from a receiving terminal.

The method of transmitting data further comprises: (c) monitoring the error degree that is added to the negative acknowledgement message and transmitted to the transmitting terminal, for a predetermined amount of time and predicting a channel environment; and (d) adjusting the initial coding rate in consideration of the predicted channel environment.

According to another aspect of the present invention, a method of receiving data in an adaptive hybrid automatic repeat request system comprises: (a) transmitting a data frame comprising a data bit and a parity bit that are channel-coded using a predetermined initial coding rate; (b) receiving the data frame, performing channel decoding of the received data frame, and when an error exists in the channel-decoded data frame, correcting the error; (c) when there is no error in the channel-decoded data frame or the error is corrected, transmitting an acknowledgement message to a transmitting terminal; (d) when the error of the channel-decoded data frame is not corrected, measuring an error degree of a corresponding frame and transmitting a negative acknowledgement message to which the measured error degree is added, to the transmitting terminal; (e) transmitting a parity frame that is generated by performing channel coding of a parity bit corresponding to a parity level determined in accordance with the error degree added to the negative acknowledgement message; and (f) combining the retransmitted parity bit with a data bit of a data frame in which error correction fails and performing channel decoding and error correction.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Preferred embodiments of the present invention will be described in detail herein below, examples of which are illustrated in the accompanying drawings.

Figure 2:
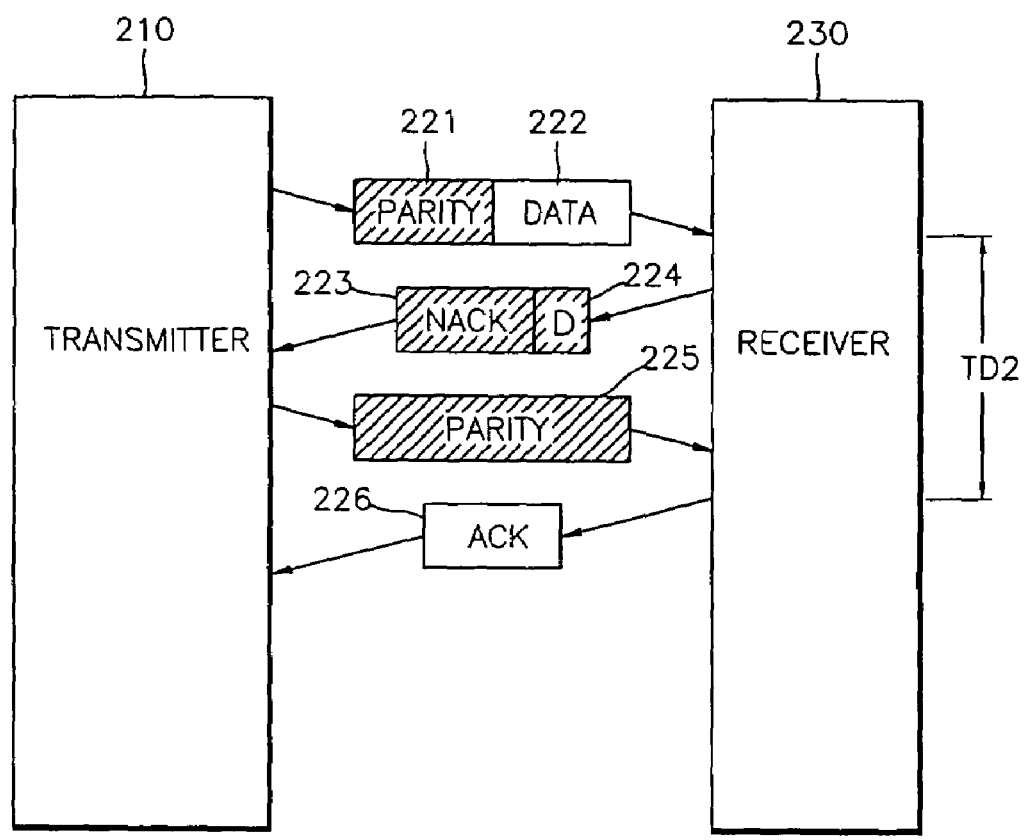
FIG. 2 illustrates an adaptive hybrid ARQ method according to the present invention.

An adaptive hybrid ARQ method according to the present invention will be described below with reference to FIG. 2. In FIG. 2, a transmitter 210 transmits a data frame comprising a parity bit 221 and a data bit 222 that are generated by performing channel coding using a code having a high coding rate during initial transmission. A receiver 230 receives the data frame and performs channel decoding. When an error occurs during channel decoding and error correction fails, the receiver 230 measures an error degree of a frame in which error correction fails, and transmits a NACK message 223 to which the measured error degree D 224 is added, to the transmitter 210. When receiving the NACK message 223, the transmitter 210 interprets the error degree D 224 from the NACK message 223 and transmits a parity frame 225 that is generated using a code having a coding rate determined in accordance with the error degree D 224. The receiver 230 corrects an error that occurs in a data bit of a previous frame in which error correction fails, using the transmitted parity frame 225. If error correction is successful, the receiver 230 transmits an ACK message 226 to the transmitter 210. If error correction fails, the receiver 230 again measures the error degree D 224 and repeatedly performs step of transmitting the NACK message 223 to which the measured error degree D 224 is added, to the transmitter 210.

Figure 1:
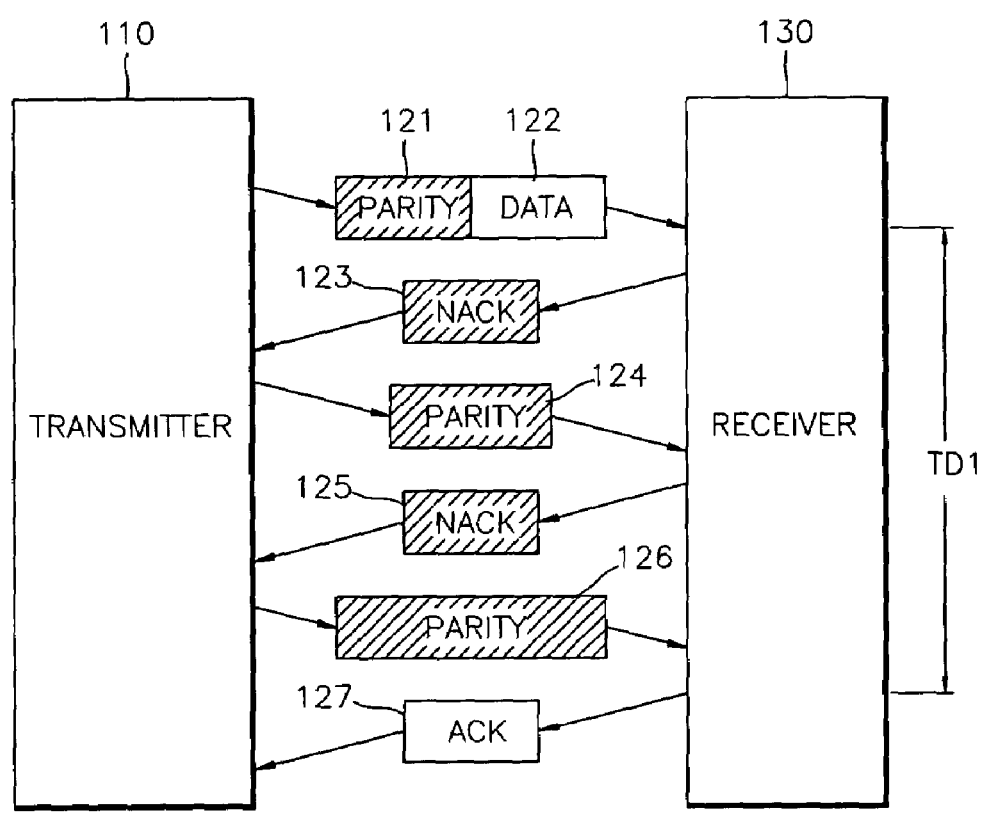
FIG. 1 illustrates a conventional hybrid type-II ARQ method.

When using the adaptive hybrid ARQ method, the number of retransmissions can be ensured to be 1 or less in a general additive white gaussian noise (AWGN) channel environment. Thus, transmission delay TD2 can be considerably reduced in comparison with transmission delay TD1 that is generated in the conventional hybrid type-II ARQ method illustrated in FIG. 1.

Figure 3:
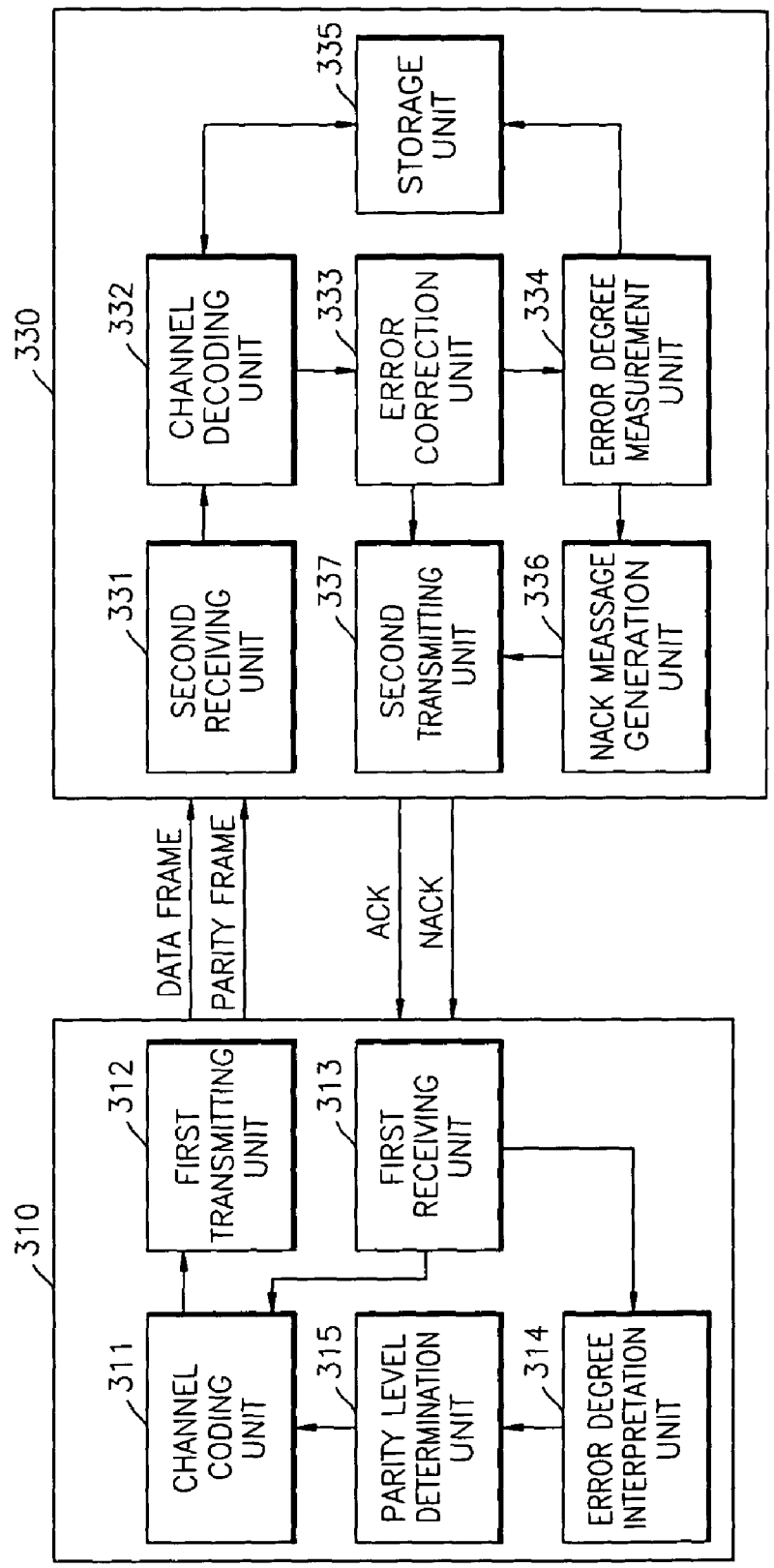
FIG. 3 is a block diagram illustrating a structure of an adaptive hybrid ARQ system according to an embodiment of the present invention.

FIG. 3 is a block diagram illustrating an adaptive hybrid ARQ system according to an embodiment of the present invention. In the adaptive hybrid ARQ system, a transmitter 310 includes a channel coding unit 311, a first transmitting unit 312, a first receiving unit 313, an error degree interpretation unit 314, and a parity level determination unit 315. Further, a receiver 330 includes a second receiving unit 331, a channel decoding unit 332, an error correction unit 333, an error degree measurement unit 334, a storage unit 335, a NACK message generation unit 336, and a second transmitting unit 337.

In the transmitter 310, the channel coding unit 311 performs channel coding of a data frame including a data bit and a parity bit using an initial coding rate by using a code in which soft iterative decoding can be performed, such as a low density parity check (LDPC) code, a turbo code, or a convolutional code; and performs channel coding of a parity frame including a parity bit of a parity level that is determined by the parity level determination unit 315 which will be described later. More details for LDPC code are described in the articles "On The Design of Low-Density Parity-Check Codes Within 0.0045 dB of the Shannon Limit," by S. Y. Chung, J. G. D. Formey, T. Richardson and R. Urbanke, IEEE Commun. Lett., Vol. 5, pp. 58–60, February 2001 and "Near Shannon Limit Performance of Low Density Parity Check Codes," by D. J. C. MacKay and R. Neal, Electron Letters, Vol. 33, pp. 457–8, March 1997. In addition, more details for soft iterative decoding are described in the book "*Constrained Coding and Soft Iterative Decoding*," by J. L. Fan, Kluwer academic publishers, 2001.

The first transmitting unit 312 includes a transmission buffer (not shown), which adds header information on a corresponding frame to the data frame or the parity frame that is channel-coded by the channel coding unit 311 to then transmit the data frame or the parity frame to the receiver 330 via an AWGN channel.

The first receiving unit 313 receives an ACK message or a NACK message that is transmitted from the transmitter 330. When receiving the ACK message, the first receiving unit 313 transmits information on the ACK message to the channel coding unit 311. When receiving the NACK message, the first receiving unit 313 transmits the NACK message to the error degree interpretation unit 314. The error degree interpretation unit 314 extracts the error degree from the NACK message transmitted from the first receiving unit 313 to interpret the error degree.

The parity level determination unit 315 stores a table that maps the error degree and the parity level in advance, and determines the level of a parity, for example, a parity for Forward Error Correction (FEC), from the mapping table, in accordance with the error degree interpreted by the error degree interpretation unit 314 to provide the determined parity level to the channel coding unit 311. An example of a FEC level used in the mapping table is shown in Table 1 as below.

TABLE 1

| FEC level | Parity bit number | LDPC code |
|---|---|---|
| FEC-1 | 250 | (750, 500, 3) |
| FEC-2 | 500 | (1000, 500, 3) |
| FEC-3 | 1,000 | (1500, 500, 3) |
| FEC-4 | 1,000 × 2 | (1500, 500, 3) |
| FEC-5 | 1,000 × 4 | (1500, 500, 3) |

Figure 6:
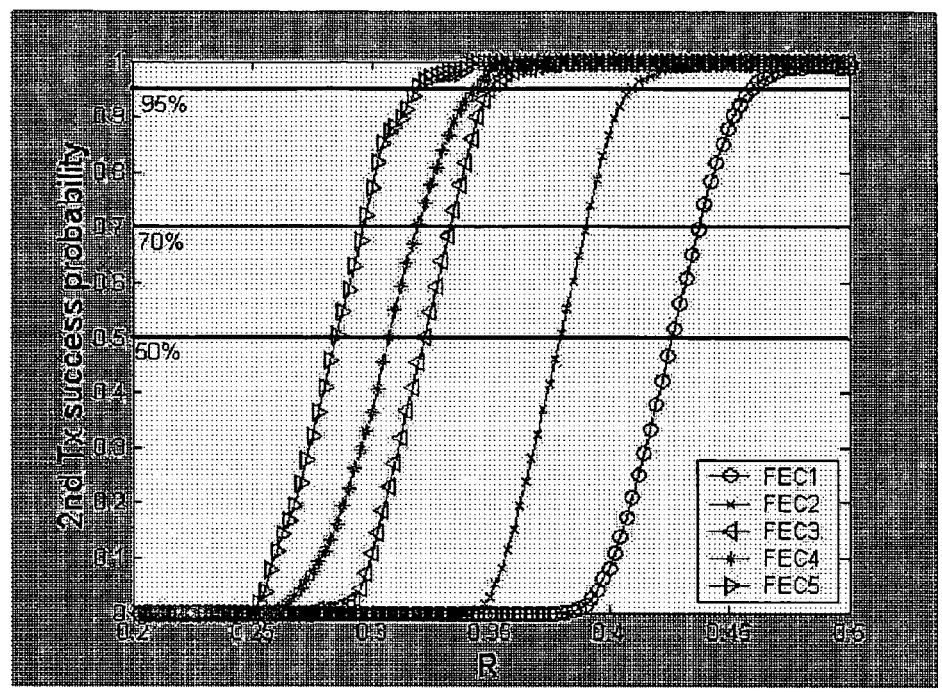
FIG. 6 is a graph showing a retransmission success probability according to a coding rate when the adaptive hybrid ARQ method according to the present invention is used.

The mapping table shown in Table 1 illustrates an example in which data is coded using a LDPC code (625, 500, 3), i.e., a code rate Rc 4/5, during initial transmission. As an FEC level is increased, the number of parity bits is increased twice. In particular, at FEC levels such as FEC-4 and FEC-5, parity bit numbers 1000×2 and 1000×4, each formed of (1500, 500, 5), are transmitted. This is because several parity bits are simultaneously transmitted to minimize retransmission delay when an error exceeding an error correction capability occurs. FIG. 6 is a graph showing a retransmission success probability according to a parity at each FEC level in accordance with a reliability R, which is inversely proportional to the error degree. As the reliability R is reduced, a stronger parity is needed.

In the receiver 330, the second receiving unit 331 includes a receiving buffer (not shown) and receives the data frame or the parity frame from the transmitter 310 via the AWGN channel. When receiving a data frame from the second receiving unit 331, the channel decoding unit 332 decodes a data bit of the data frame using a channel code used in the transmitter 310. When receiving the parity frame from the second receiving unit 331, the channel decoding unit 332 combines the parity frame with the data bit of a previous frame in which error correction fails, to perform channel decoding.

The error correction unit 333 determines whether an error occurs in the data bit that is channel-decoded by the channel decoding unit 332. To this end, an error detection code $C_0$ may be used in the same manner as the conventional type-II ARQ method when a turbo code or a convolutional code is used for encoding. Further, an LDPC itself having a function of error detection may be used when an LDPC code is used for encoding. When the error occurs, the error correction unit 333 performs error correction of the decoded data bit using the parity bit of the data frame and determines whether error correction is successful. When error correction is successful or an error does not occur in the channel-decoded data bit, the error correction unit 333 generates an ACK message and transmits the ACK message to the transmitter 310 via the second transmitting unit 337.

However, when it is determined in the error correction unit 333 that error correction fails, the error degree measurement unit 334 measures an error degree of the data frame in which error correction fails. In an embodiment in which a LDPC code is used, the value of posterior probability is used. This will be described in greater detail herein below.

A soft decoding algorithm in which the reliability of each bit is gradually improved as an iterative decoding operation is performed, is used in the LDPC code. As the iterative decoding operation is performed, the value of posterior probability is changed to '1' or '0'. Thus, as the value of posterior probability is closer to '0.5', the unreliability of a receiving side is increased and the reliability of a corresponding bit is lowered. Based on this concept, reliability Ri, which is inversely proportional to an error degree of an i-th frame, can be obtained by Equation 1.

$$R_i = \frac{1}{k}\sum_{j=1}^{k}|0.5 - P_{ij}| \quad (1)$$

Figure 7:
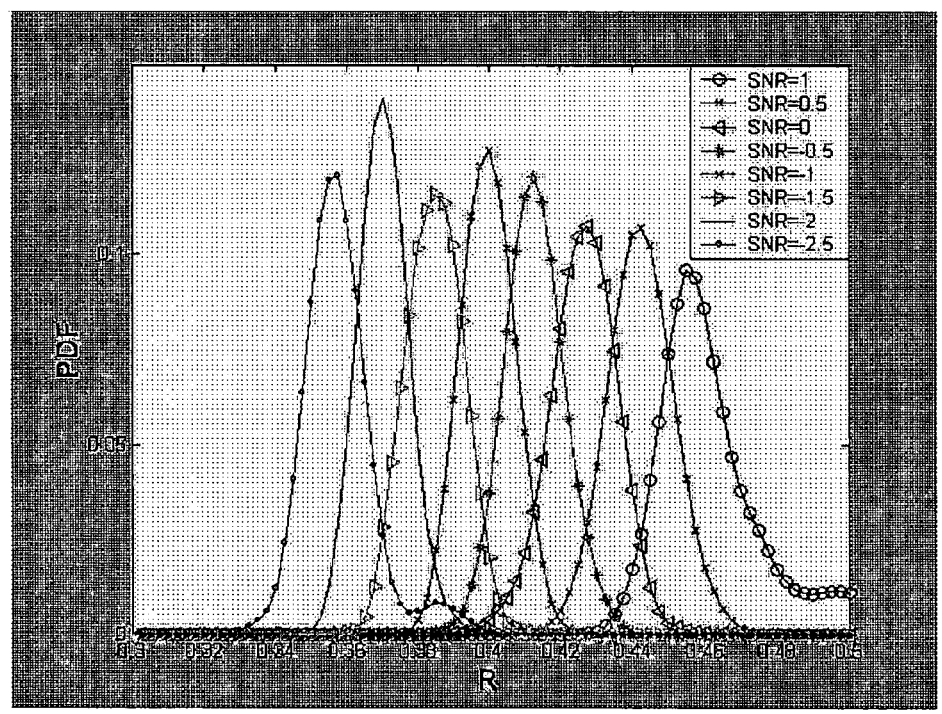
FIG. 7 is a graph showing the distribution of reliability according to signal to noise ratio (SNR)

In equation 1, k represents the length of a message bit, and $P_{ij}$ represents the value of posterior probability of a j-th message bit of the i-th frame. According to equation 1, $0 \leq R_i \leq 0.5$. In addition, as the value of $R_i$ is increased, the reliability of the message bit of the corresponding frame is improved. In the distribution of the reliability, that is error degree, R in the AWGN channel, as an SNR is reduced, an average value of R is reduced, as illustrated in FIG. 7. The graph in FIG. 7 shows iterative decoding performed thirty times using a coding rate (625, 500, 3).

The storage unit 335 adds the message bit of the data frame in which error correction fails, to the value of posterior probability to store the added message bit. Subsequently, when the second receiving unit 331 receives the parity frame from the transmitter 310, the storage unit 335 provides the stored message bit to the channel decoding unit 332.

The NACK message generation unit 336 generates a NACK message to which the error degree measured by the error degree measurement unit 334 is added, and transmits the NACK message to the transmitter 310 via the second transmitting unit 337.

Figure 4:
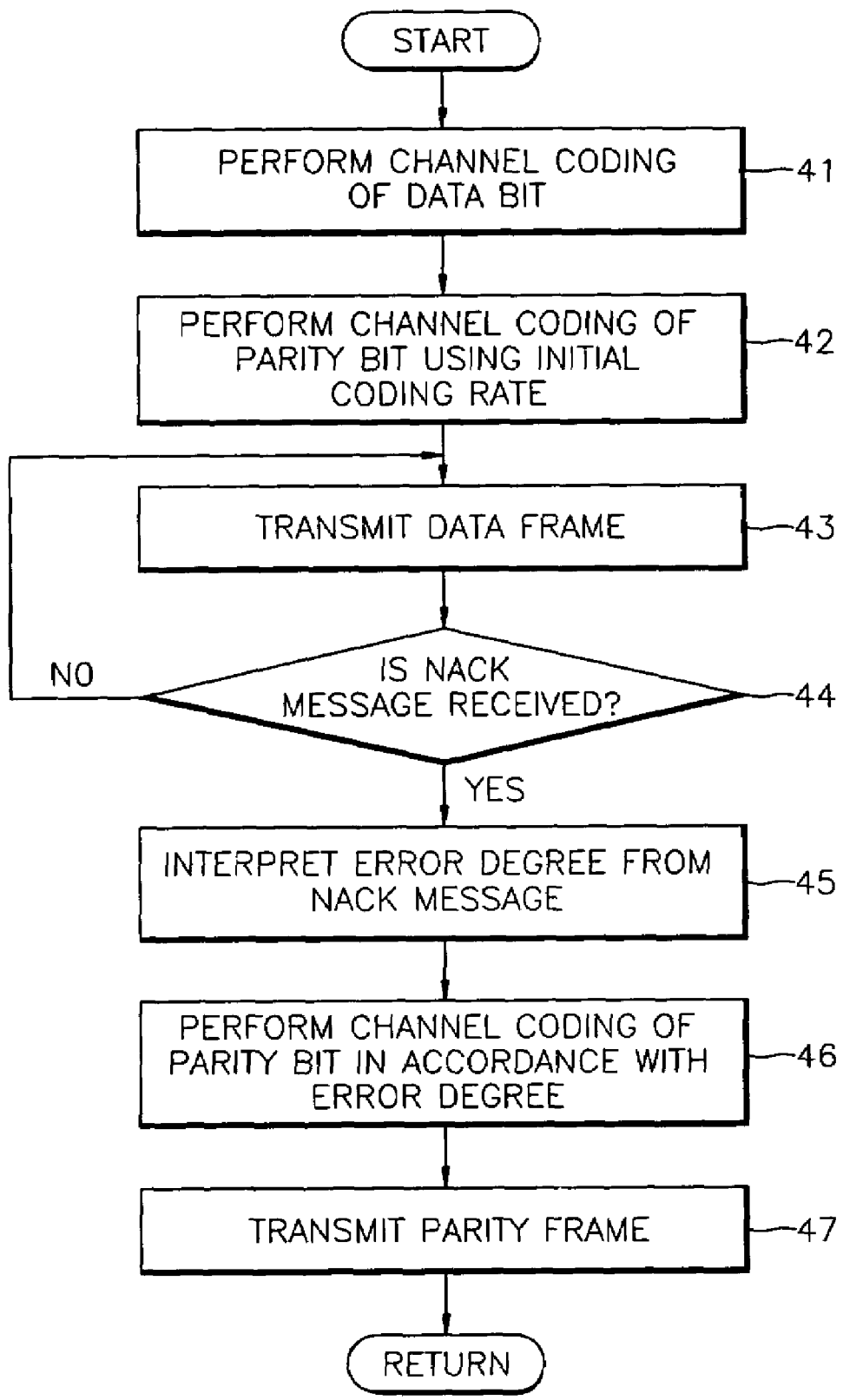
FIG. 4 is a flowchart illustrating a method of transmitting data in an adaptive hybrid ARQ system according to an embodiment of the present invention.

FIG. 4 is a flowchart illustrating a method of transmitting data in an adaptive hybrid ARQ system according to an embodiment of the present invention. Referring to FIG. 4, in steps 41 and 42, channel coding of a data frame including a data bit and a parity bit using an initial coding rate is performed by using a code in which soft output iterative decoding can be performed, such as a LDPC code, a turbo code, or a convolutional code. In step 43, the channel-coded data frame is transmitted to a receiving terminal via an AWGN channel.

In step 44, whether a NACK message is received from a receiving terminal is determined. When the NACK message is not received form the receiving terminal, that is, when an ACK message is received from the receiving terminal, in step 43, a next data frame is transmitted to the receiving terminal. However, when it is determined in step 44 that the NACK message is received, in step 45, an error degree added to the NACK message is extracted and interpreted.

In step 46, a parity level is determined in accordance with the error degree interpreted in step 45, channel coding of a parity frame is performed in accordance with the determined parity level. In step 47, a corresponding parity frame is transmitted to the receiving terminal. In order to determine the parity level in accordance with the error degree in step 46, preferably, a transmission delay time and throughput that are to be ensured should be considered. For example, in the case of a traffic in which short transmission delay should be ensured like in voice, an error should be corrected in second retransmission. Thus, preferably, the traffic is mapped to have a high error correction probability, for example, a retransmission success probability between 1 and 0.9 inclusive. However, in this case, a possibility that a stronger parity than a parity needed to correct an error that occurs actually is transmitted is increased and may cause overload. As such, preferably, the traffic in which throughput should be considered is mapped using a comparatively low error correction probability.

The error degree added to the NACK message transmitted from the receiver 330 can be monitored for a predetermined amount of time, so that a channel environment can be expected and an initial coding rate can be adjusted considering the expected channel environment.

Figure 5:
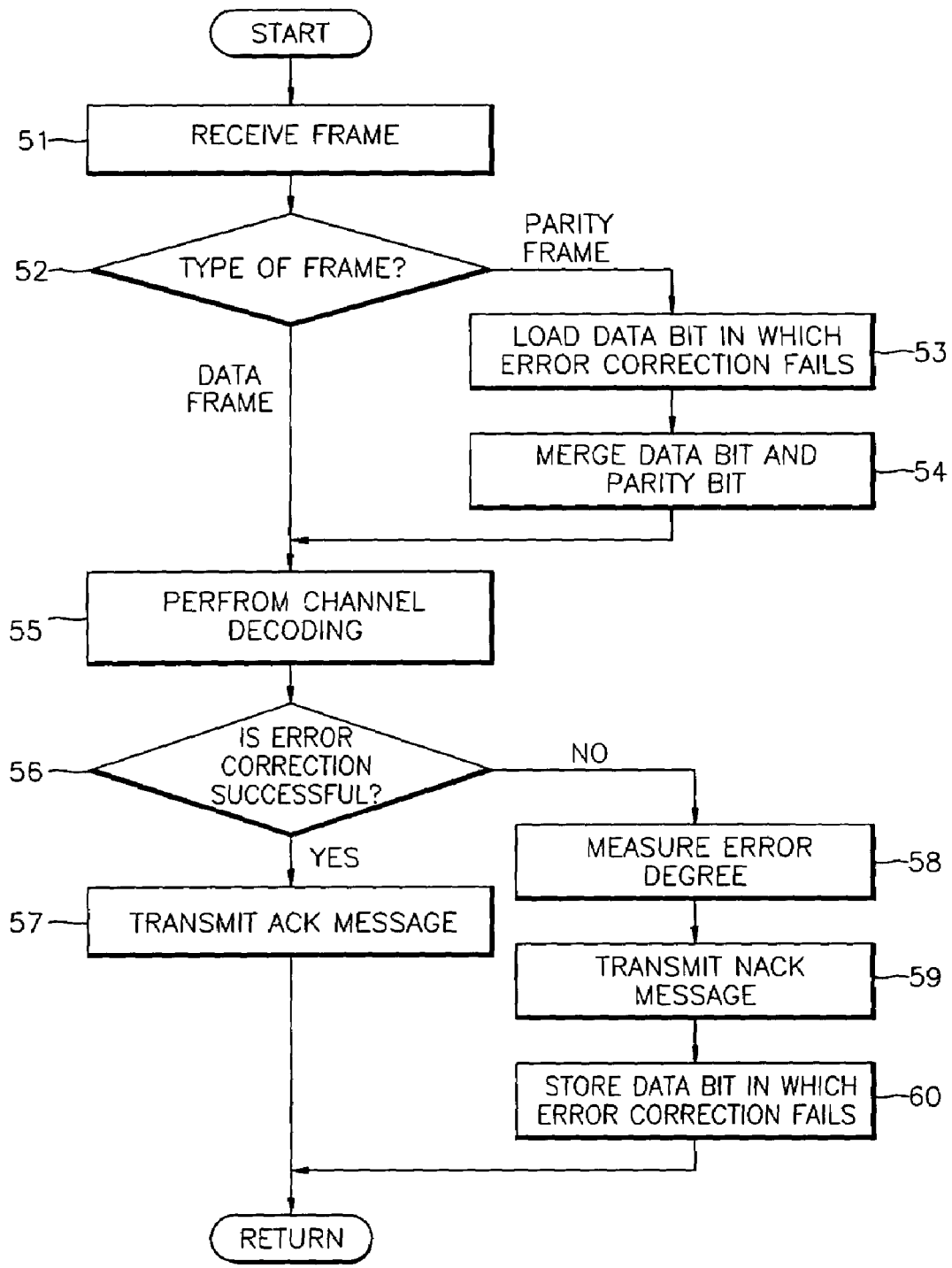
FIG. 5 is a flowchart illustrating a method of receiving data in an adaptive hybrid ARQ system according to an embodiment of the present invention.

FIG. 5 is a flowchart illustrating a method of receiving data in an adaptive hybrid ARQ system according to an embodiment of the present invention. Referring to FIG. 5, in step 51, the second receiving unit 331 receives a frame from the transmitter 310 via a transmission channel. In step 52, the type of a frame is determined from header information.

When the type of the frame is a data frame, step 55 is performed. When the type of the frame is a parity frame, in step 53, a data bit in which error correction fails is loaded from the storage unit 335, and in step 54, the loaded data bit is combined with a parity bit of the received parity frame.

In step 55, the channel decoding unit 332 and the error correction unit 333 perform channel decoding and error correction using the data frame received in step 51 or the data bit and the parity bit that are combined in step 54, respectively. In step 56, whether error correction is successful is determined.

When error correction is successful, in step 57, the error correction unit 333 generates an ACK message to transmit the ACK message to the transmitter 310 via the second transmitting unit 337. When error correction fails, in step 58, the error degree measurement unit 334 measures an error degree by the above-mentioned equation 1. In step 59, the NACK message generation unit 336 generates a NACK message to which the measured error degree is added. The generated NACK message is transmitted to the transmitter 310 via the second transmitting unit 337.

In step 60, the data bit of the data frame in which error correction fails is stored in the storage unit 335. Subsequently, when a corresponding parity frame is transmitted from the transmitter 310, the parity frame is provided to the channel decoding unit 332.

Next, the effects of the adaptive hybrid ARQ method according to the present invention and the conventional hybrid type II ARQ method will be described with reference to FIGS. 9 and 10. The graphs shown in FIGS. 9 and 10 illustrate a simulation result where an LDPC code is used and iterative decoding is performed thirty times in an AWGN channel environment.

Figure 8:
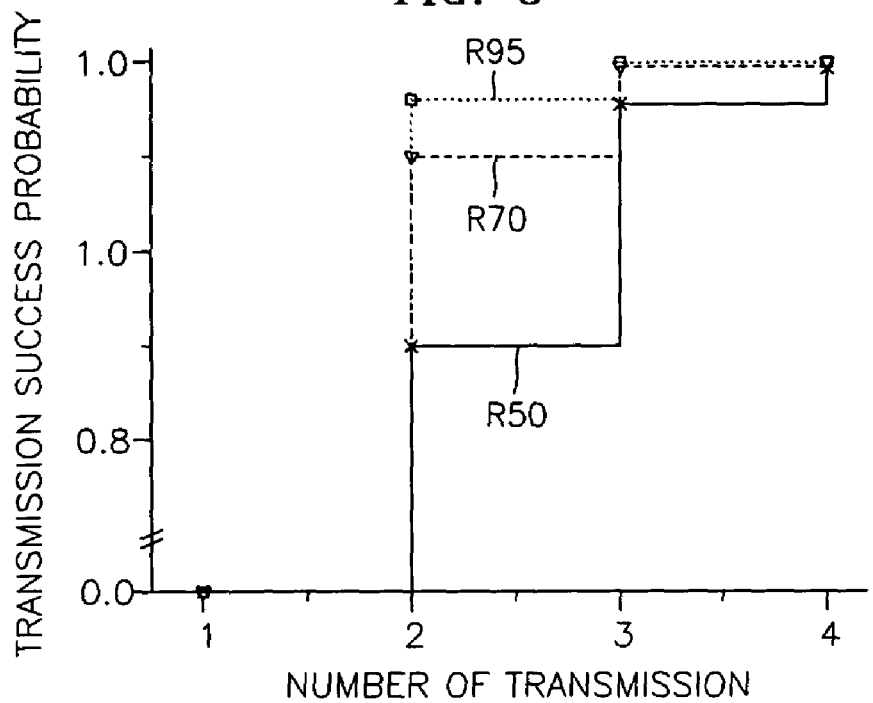
FIG. 8 is a graph showing the relation of the transmission success probability and the number of transmission when the adaptive hybrid ARQ method according to the present invention is used.
Figure 9:
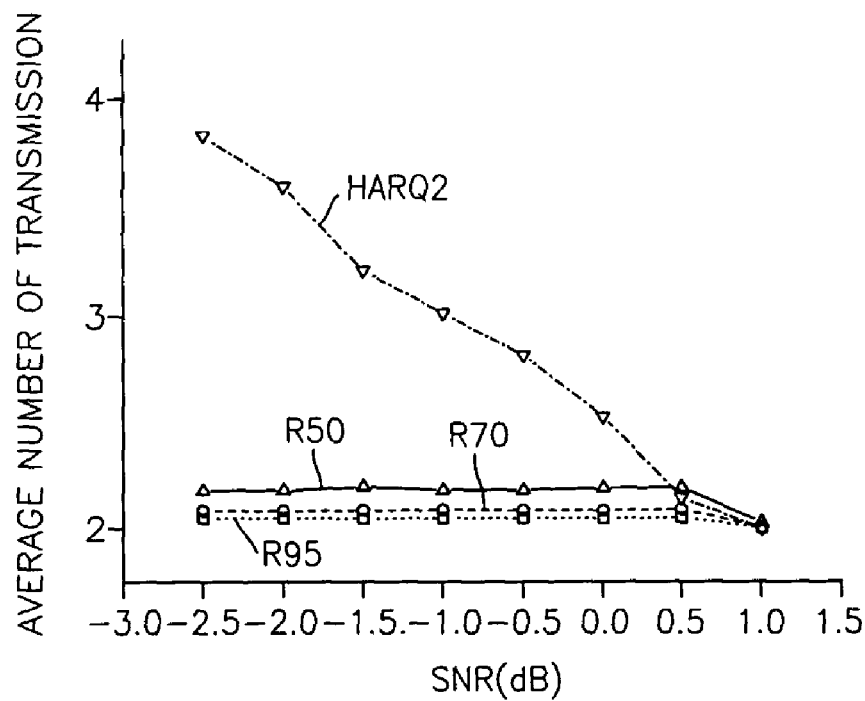
FIG. 9 is a graph showing the relation of SNR and the average number of transmission in each case where the adaptive hybrid ARQ method according to the present invention and the conventional hybrid type-II ARQ method are used.

FIG. 9 is a graph showing the relation of SNR and the average number of transmissions in each case where a retransmission success probability is set to 50% (R50), 70% (R70), and 95% (R95) using the adaptive hybrid ARQ method according to the present invention and the conventional hybrid type-II ARQ method HARQ2. In the case of HARQ2, as a channel environment is deteriorated, that is, as the SNR is reduced, the average number of transmission for each frame is continuously increased. However, in the case of the adaptive hybrid ARQ method according to the present invention, most errors are corrected during second transmission regardless of the retransmission success probability. In particular, as illustrated in FIGS. 6 and 8, if a second transmission success probability is set to 95% (R95) when the error degree is mapped to the parity level, during second transmission, i.e., during retransmission, an error over 98% as average is corrected. Even when the second transmission success probability is set to 70% (R70) or 50% (R50) in consideration of throughput, an error over 85% as average is corrected. Even when an error occurs in services that are sensitive in transmission delay, such as voice traffic, an error correction can be performed within the fastest time by means of mapping of the error degree and the parity level based on a high retransmission success probability.

Figure 10:
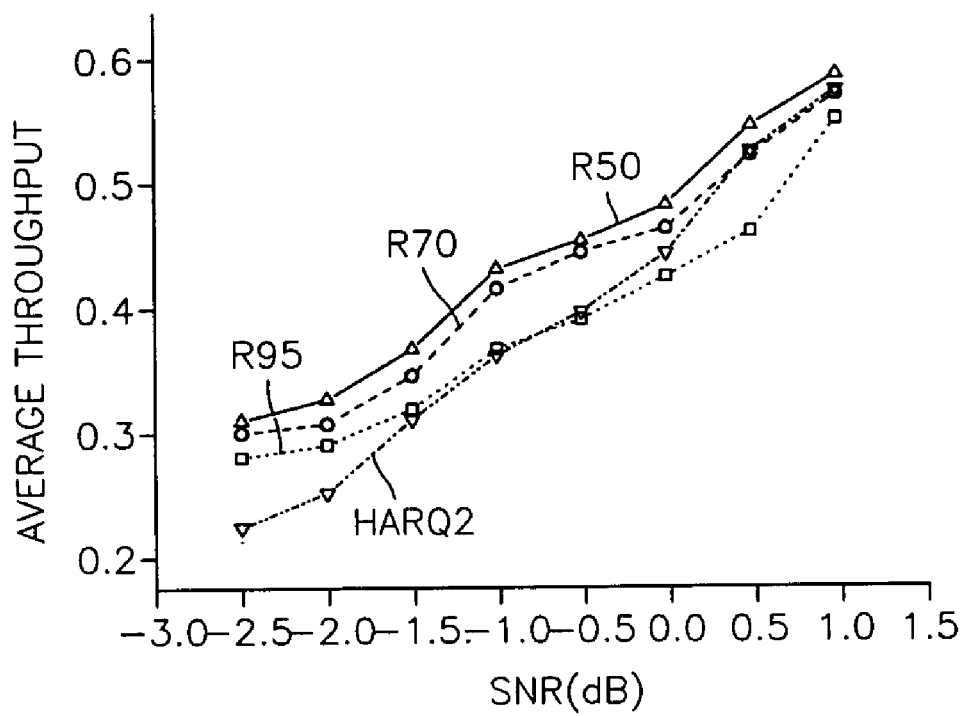
FIG. 10 is a graph showing the relation of the SNR and an average throughput in each case where the adaptive hybrid ARQ method according to the present invention and the conventional hybrid type-II ARQ method are used.

FIG. 10 is a graph showing the relation of the SNR and an average throughput in each case where a retransmission success probability is set to 50% (R50), 70% (R70), and 95% (R95) using the adaptive hybrid ARQ method according to the present invention and the conventional hybrid type-II ARQ method. Referring to FIG. 10, when the state of a channel is good, that is, when the SNR is large, there is no specific difference between the present invention and prior art. When a channel environment is deteriorated, in the case of HARQ2, the number of transmissions for each frame is increased, such that a parity bit transmitted during a procedure reaching a parity level that can correct an error occurring in initial transmission, causes overload and leads to reduced throughput. On the other hand, in three cases in which the adaptive hybrid ARQ method according to the present invention is used, that is, in cases of R50, R75, and R90, throughput is improved. In the case of a general data traffic, it is preferable to consider throughput as well as a retransmission success probability. Thus, a probability that a burdensome parity may be transmitted can be reduced by means of mapping of the error degree and the parity level based on a low retransmission success probability.

The present invention can also be embodied as a computer readable code on a computer readable recording media. The computer readable recording media include all types of recording devices in which data that can be read by a computer system are stored, such as ROMs, RAMs, CD-ROMs, magnetic tapes, floppy discs, optical data storage units, and carrier waves (for example, transmission via the Internet). Also, the computer readable recording media are distributed over a network-connected computer system and can be stored and executed by computer readable codes. In addition, a functional program, a code, and code segments can be easily inferred by programmers in the technical field to which the present invention pertains.

As described above, in the adaptive hybrid ARQ system, at the receiving terminal, the error degree of the message bit is measured using the value of posterior probability of the message bit that is generated through a decoding operation and the NACK message to which the measured error degree is added is transmitted to the transmitting terminal. At the transmitting terminal, the parity level is determined in accordance with the error degree of the message bit contained in the NACK message, and the parity frame that is channel-decoded in accordance with the parity level is transmitted to the receiving terminal, such that when the channel environment is deteriorated or rapidly changed and the condition of a communications channel cannot be expected, the adaptive hybrid ARQ system can operate adaptively and the number of retransmission and transmission delay can be remarkably reduced.

In addition, the adaptive hybrid ARQ system can be embodied by adding only an error degree determination routine of the receiving terminal and a corresponding parity generation routine of the transmitting terminal to a general hybrid type II ARQ protocol, such that backward compatibility with an existing hybrid type II ARQ system can be ensured. As such, the adaptive hybrid ARQ system can be used in a high-speed downlink packet access (HSDPA) system, which is a high-speed packet data transmission system used in IMT-2000.

Further, the error degree measured from the frame in which error correction fails, is used for general adaptive channel coding. The change of an error degree value added to the NACK message transmitted from the receiving terminal is monitored, such that the change of the channel is predicted and a data coding rate at the transmitting terminal is adjusted. Accordingly, a layer that takes charge of channel coding can operate independently with respect to other layers.

While this invention has been particularly shown and described with reference to certain preferred embodiments thereof, it will be understood by those skilled in the art that various changes in form and details may be made therein without departing from the spirit and scope of the invention as defined by the appended claims.

What is claimed is:

1. An adaptive hybrid automatic repeat request method comprising:
    (a) transmitting a data frame including a data bit and a parity bit that are channel-coded using a predetermined initial coding rate;
    (b) receiving the data frame, performing channel decoding of the received data frame, and when an error exists in the channel-decoded data frame, correcting the error;
    (c) when the error of the channel-decoded data frame is not corrected, measuring an error degree of a corresponding frame and transmitting a negative acknowledgement message to which the measured error degree is added, to the transmitting terminal;
    (d) transmitting a parity frame that is generated by performing channel coding of a parity bit corresponding to a parity level determined in accordance with the error degree added to the negative acknowledgement message; and
    (e) combining the retransmitted parity bit with a data bit of a data frame in which error correction fails and performing channel decoding and error correction.

2. The method of claim 1, wherein in step (c), when a low density parity check code is used for the channel coding, the error degree of the frame is measured using a value of posterior probability of each data bit of the decoded data frame.

3. The method of claim 2, wherein the error degree is determined as an average value of an absolute difference between the value of posterior probability of each data bit of the frame in which error correction fails and a predetermined reference value.

4. The method of claim 3, wherein the predetermined reference value is 0.5.

5. The method of claim 1, wherein the parity level includes a parity number and a parity coding rate.

6. The method of claim 1, wherein in step (d), the parity level in accordance with the error degree is determined in consideration of a retransmission success probability and throughput.

7. The method of claim 1, further comprising:
    (f) monitoring the error degree that is added to the negative acknowledgement message and transmitted to the transmitting terminal, for a predetermined amount of time and predicting a channel environment; and
    (g) adjusting the initial coding rate in consideration of the predicted channel environment.

8. A method of transmitting data in an adaptive hybrid automatic repeat request system, the method comprising:
   (a) transmitting a data frame including a data bit and a parity bit that are channel-coded using a predetermined initial coding rate; and
   (b) retransmitting a parity frame that is generated by performing channel coding of a parity bit corresponding to a parity level determined in accordance with an error degree added to a negative acknowledgement message transmitted from a receiving terminal.

9. The method of claim 8, further comprising:
   (c) monitoring the error degree that is added to the negative acknowledgement message and transmitted to the transmitting terminal, for a predetermined amount of time and predicting a channel environment; and
   (d) adjusting the predetermined initial coding rate in consideration of the predicted channel environment.

10. The method of claim 8, wherein in step (b), the parity level in accordance with the error degree is determined in consideration of a retransmission success probability and throughput.

11. A method of receiving data in an adaptive hybrid automatic repeat request system, the method comprising:
   (a) receiving a data frame transmitted from a transmitting terminal, performing channel decoding of the received data frame, and when an error exists in the channel-decoded data frame, correcting the error;
   (b) when the error of the channel-decoded data frame is not corrected, measuring an error degree of a corresponding frame and transmitting a negative acknowledgement message to which the measured error degree is added, to the transmitting terminal; and
   (c) combining a parity bit that corresponds to the negative acknowledgement message and is retransmitted from the transmitting terminal, with a data bit of a data frame in which error correction fails and performing channel decoding and error correction.

12. The method of claim 11, wherein in (b), when a low density parity check code is used for the channel coding, the error degree of the frame is measured using a value of posterior probability of each data bit of the channel-decoded data frame.

13. The method of claim 12, wherein the error degree is determined as an average value of an absolute difference between the value of posterior probability of each data bit of the frame in which error correction fails and a predetermined reference value.

14. The method of claim 13, wherein the predetermined reference value is 0.5.

15. A computer readable recording medium in which a program for executing an adaptive hybrid automatic repeat request method is recorded, the method comprising:
   (a) transmitting a data frame including a data bit and a parity bit that are channel-coded using a predetermined initial coding rate;
   (b) receiving the data frame, performing channel decoding of the received data frame, and when an error exists in the channel-decoded data frame, correcting the error;
   (c) when the error of the channel-decoded data frame is not corrected, measuring an error degree of a corresponding frame and transmitting a negative acknowledgement message to which the measured error degree is added, to the transmitting terminal;
   (d) transmitting a parity frame that is generated by performing channel coding of a parity bit corresponding to a parity level determined in accordance with the error degree added to the negative acknowledgement message; and
   (e) combining the retransmitted parity bit with a data bit of a data frame in which error correction fails and performing channel decoding and error correction.

16. A computer readable recording medium in which a program for executing the method of transmitting data in an adaptive hybrid automatic repeat request system is recorder, the method comprising:
   (a) transmitting a data frame including a data bit and a parity bit that are channel-coded using a predetermined initial coding rate; and
   (b) retransmitting a parity frame that is generated by performing channel coding of a parity bit corresponding to a parity level determined in accordance with an error degree added to a negative acknowledgement message transmitted from a receiving terminal.

17. A computer readable recording medium in which a program for executing the method of receiving data in an adaptive hybrid automatic repeat request system is recorded, the method comprising:
   (a) receiving a data frame transmitted from a transmitting terminal, performing channel decoding of the received data frame, and when an error exists in the channel-decoded data frame, correcting the error;
   (b) when the error of the channel-decoded data frame is not corrected, measuring an error degree of a corresponding frame and transmitting a negative acknowledgement message to which the measured error degree is added, to the transmitting terminal; and
   (c) combining a parity bit that corresponds to the negative acknowledgement message and is retransmitted from the transmitting terminal, with a data bit of a data frame in which error correction fails and performing channel decoding and error correction.

18. An adaptive hybrid automatic repeat request apparatus comprising:
   a transmitter for transmitting a data frame including a data bit and a parity bit that are channel-coded using a predetermined initial coding rate, and retransmitting a parity frame that is generated by performing channel coding of a parity bit corresponding to a parity level determined in accordance with an error degree added to a negative acknowledgement message transmitted via a predetermined channel; and
   a receiver for receiving the data frame transmitted from the transmitter, performing channel decoding of the received data frame, when the error of the channel-decoded data frame is not corrected, measuring the error degree of a corresponding frame and transmitting a negative acknowledgement message to which the measured error degree is added, to the transmitter, combining a parity bit that corresponds to the negative acknowledgement message and is retransmitted from the transmitter, with a data bit of a data frame in which error correction fails and performing channel decoding and error correction.

19. The apparatus of claim 18, wherein the parity level in accordance with the error degree is determined in consideration of a retransmission success probability and throughput.

20. The apparatus of claim 18, wherein the error degree is determined as an average value of an absolute difference between the value of a posterior probability of each data bit of the frame in which error correction fails and a predetermined reference value.

* * * * *